Figure 1:
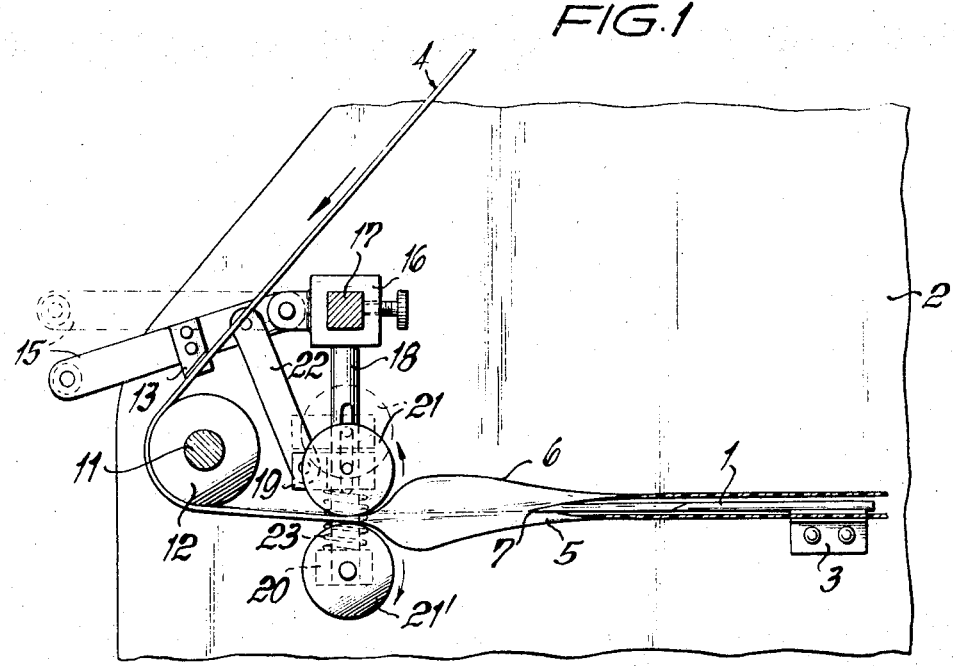

United States Patent [19]
Peters

[11] 3,789,713
[45] Feb. 5, 1974

[54] APPARATUS FOR SLITTING SEAMLESS FLATTENED TUBES OF PLASTICS FILM

[75] Inventor: Rudolf Peters, Lengerich of Westphalia, Germany

[73] Assignee: Windmolter & Holscher, Lengerich of Westphalia, Germany

[22] Filed: May 30, 1972

[21] Appl. No.: 257,546

[30] Foreign Application Priority Data
June 8, 1971 Germany................. P 21 28 534.7

[52] U.S. Cl.................... 83/184, 83/54, 83/407, 83/436
[51] Int. Cl............................................. B26d 3/12
[58] Field of Search........ 83/184, 178, 54, 407, 436

[56] References Cited
UNITED STATES PATENTS
3,068,730  12/1962  Johnson................................ 83/184

FOREIGN PATENTS OR APPLICATIONS
692,708   6/1953   Great Britain................. 83/178
777,886   6/1957   Great Britain................. 83/178
1,178,202  9/1964   Germany...................... 83/178

Primary Examiner—Frank T. Yost
Attorney, Agent, or Firm—Martin Fleit et al.

[57] ABSTRACT

An apparatus for slitting a longitudinally fed flattened tube of plastics film comprises a cutting device for forming longitudinal incisions in both walls of the tube near one longitudinal edge thereof, temporarily operative means downstream of the cutting device for separating the tube walls at the longitudinal incisions, and a slitting knife which is disposed downstream of the cutting device in the medial plane of the tube, is adapted to enter the tube through the separation brought about by the separating means, and is thereafter adapted to slit the tube along said longitudinal edge.

8 Claims, 2 Drawing Figures

PATENTED FEB 5 1974  3,789,713

APPARATUS FOR SLITTING SEAMLESS FLATTENED TUBES OF PLASTICS FILM

The invention relates to an apparatus for slitting seamless flattened tubes of plastics film so as to form a slit tube or two superposed webs of film.

In one known slitting apparatus, a tubular film of plastics material which is produced by a blowing method with the aid of an extruder and folded flat by means of a pair of squeeze rollers is cut open at both its folded edges to form two separate webs of film. After resetting of the extruder it is usual to wind the tubular waste material that occurs on starting the blowing equipment onto a coil. When the film that is being produced is of the desired quality, the webs of film are then separately coiled on two other rollers to which the webs are directed with the aid of roll-changing apparatus. However, before this can take place slitting knives must be introduced in the flattened tube of film. This procedure is made difficult by the high production speed for the film and the tendency of the walls of the tube to adhere to one another. Hitherto, introduction of the slitting knives could be carried out during production of the tubular film only by means of the skilled co-operation of several operators.

The invention aims to provide a slitting apparatus which can be located downstream of the machinery for making the tubular film and comprises at least one slitting knife which can be reliably introduced in the flattened tubular film by only one operator.

According to the invention, an apparatus for slitting seamless flattened tubes of plastics film which is being fed longitudinally comprises at least one slitting knife disposed substantially in the medial plane of the flattened tube so as to cut the tube along a fold line at one longitudinal edge, a temporarily operative cutting device upstream of the slitting knife for longitudinally incising the tube perpendicular to said medial plane at a margin containing said fold line, and means interposed between the cutting device and slitting knife for temporarily opening the flattened tube at the longitudinal incisions formed by the cutting device whereby to facilitate introduction of the slitting knife in the tube.

By means of the invention, therefore, a margin of the flattened tube is cut off temporarily during continued feeding of the tube and at these cut edges the opening means can separate the tube walls to permit introduction of the slitting knife. Subsequently, the cutting device is made inoperative again but by this time the slitting knife is located inside the folded tube and continued feeding of the tube causes the folded edge to run onto the slitting knife and be slit open.

The cutting device may comprise a blade carried by a pivotal lever. By pivoting the lever the longitudinal incisions will then be formed perpendicular to the medial plane of the flattened tube. The pivotable lever may also be effective to actuate the tube opening means so as to save time and avoid unnecessary waste of material.

The tube opening means preferably comprise a pair of rollers which have an adhesive peripheral surface and are adapted to be brought into contact with the tube sides. Such opening means are simple and will provide an opening of adequate size for introduction of the slitting knife in so far that the rollers are set into rotation under the friction of the film moving therebetween and the tube walls adhere to the rollers and are temporarily deflected to separate from one another.

The peripheral surfaces of the rollers may be made adhesive with the aid of a film of adhesive but the same effect can be brought about with the aid of suction means.

In one form of the invention, the rollers are spring-biassed to an inoperative position at which they are out of contact with the tube. This will avoid damage of the film by the rollers and the associated cutting device after the slitting knife has been introduced in the tube.

The cutting device and tube opening means may together be adjustable on a cross-member. This saves time when the apparatus is reset to operate on a tubular film of different size.

Figure 2:
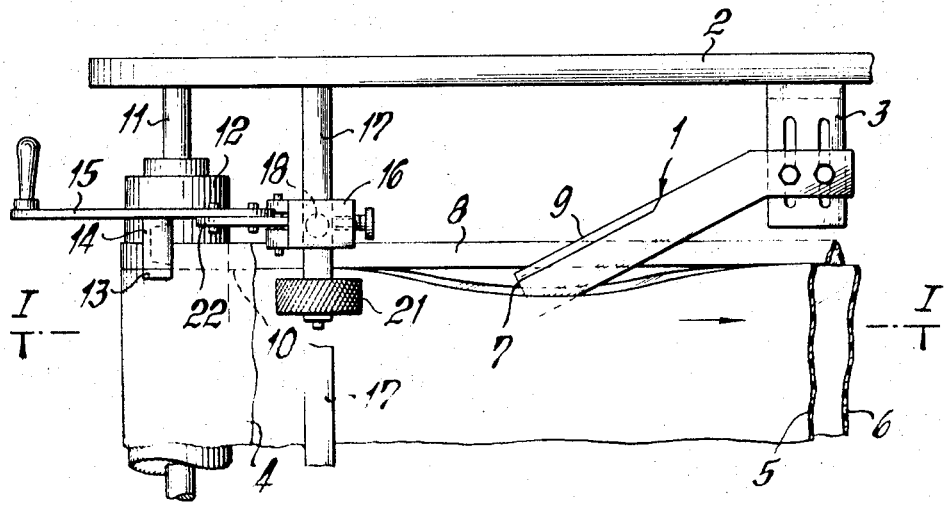

An example of the invention will now be described with reference to the accompanying drawing, wherein:

FIG. 1 is a sectional side elevation of a slitting apparatus taken on the line I—I in FIG. 2, and FIG. 2 is a diagrammatic plan view of the apparatus.

The slitting apparatus comprises a slitting knife 1 adjustably carried by a mounting 3 on a machine frame 2. The knife 1 serves to slit open a tubular plastics film 4 which is flattened to form side walls 5 and 6. During slitting, the end 7 of the knife 1 is located between the walls 5 and 6 of the tube so that the latter, which is continually fed in the direction of the arrow indicated in FIG. 2, runs up onto the cutting edge 9 of the knife 1 and is slit open at one longitudinal folded edge.

Before the slitting knife 1 is introduced in the tube, it is located to one side of the tube in a plane spaced a small distance from the medial plane of the flattened tube and thus at this stage the tube does not make contact with the knife.

Means are provided for temporarily producing a marginal incision 10 through both walls 5, 6 of the tube 4. These means are located upstream of the knife 1 in the vicinity of a direction-changing roll 12 for the tube, the roll 12 being rotatable about a shaft 11. More particularly, there is a cutting blade 13 carried by a bracket 14 on a pivotable hand lever 15. The lever 15 is mounted in a block 16 which is adjustable along a cross-member 17 fixed to the frame 2.

The underside of the block 16 carries a cylindrical pin 18 which supports mountings 19, 20 for rotatable opening rollers 21, 21' respectively. The mounting 19 is longitudinally displaceable along the pin 18 and is coupled to the lever 15 by a hinged link 22. When the cutting blade 13 is operated by depressing the lever 15, the opening roller 21 is therefore simultaneously lowered towards the flattened tube 4. The roller 21' is at a small spacing from the tube 4 in a position determined by the location of the mounting 20 on the pin 18 and therefore limits the amount of deflection of the tube 4 as the roller 21 is lowered onto it. The two rollers 21, 21' are rotated under friction by the tube 4 that is clamped therebetween. At their peripheral surfaces, the rollers are provided with a film of adhesive.

When the leading end of the incision 10 produced by the blade 13 has reached the opening rollers 21, 21' so that the tube has been divided into a portion containing the side walls 5, 6 and a marginal portion 8 containing the fold line along which the tube is later to be slit by the knife 1, the rotating rollers 21, 21' will adhere to the walls 5, 6 and deflect them in their respective directions of rotation (see FIG. 1). Excessive deflection is prevented by the tension in the tube material but a wedge-shaped side opening is nevertheless created at the incision 10 to permit introduction of the knife 1 in the tube 4. In the illustrated position of the knife 1, deflection of the upper wall 5 as initiated by the roller 21 is assisted by contact with the oblique end 7 of the knife 1 and the knife will actually enter between the walls 5 and 6 automatically.

A compression spring 23 is interposed between the mountings 19 and 20 for the opening rollers. This spring is stressed when the lever 15 is depressed and, after the incision 10 has been formed and the lever 15 is released, the spring will move the lever 15 and the roller 21 to an inoperative position.

If it is desired to slit open both folded longitudinal edges of the tube 4, two slitting knives 1 will be required, one at each edge of the folded tube. The equipment as just described is therefore duplicated at the other folded edge (not shown) but, in order to simplify actuation of the apparatus, it is preferred to intercouple the equipment at both edges by any suitable mechanical means.

I claim:

1. Apparatus for slitting seamless flattened tubes of plastics film which is being fed longitudinally, comprising at least one slitting knife disposed substantially in the medial plane of the flattened tube so as to cut the tube along a fold line at one longitudinal edge, a temporarily operative cutting device upstream of the slitting knife for longitudinally incising the tube perpendicular to said medial plane at a margin containing said fold line, and means interposed between the cutting device and slitting knife for temporarily opening the flattened tube at the longitudinal incisions formed by the cutting device whereby to facilitate introduction of the slitting knife in the tube.

2. Apparatus according to claim 1, wherein the cutting device comprises a blade carried by a pivotable lever.

3. Apparatus according to claim 2, wherein the pivotable lever is also effective to actuate the tube opening means.

4. Apparatus according to claim 1, wherein the tube opening means comprise a pair of rollers which have an adhesive peripheral surface and are adapted to be brought into contact with the tube sides.

5. Apparatus according to claim 4, wherein the rollers are provided with a film of adhesive.

6. Apparatus according to claim 4, wherein the rollers are spring-biassed to an inoperative position at which they are out of contact with the tube.

7. Apparatus according to claim 1, wherein the cutting device and tube opening means are together displaceable on a cross-member.

8. Apparatus according to claim 1 including a further said slitting knife, cutting device and tube opening means operative at the fold line of the opposite longitudinal edge of the flattened tube.

* * * * *